Aug. 7, 1928.  V. H. HARBERT  1,679,420
SAFETY DEVICE FOR RAILROAD CAR BRAKE BEAMS
Filed March 17, 1925
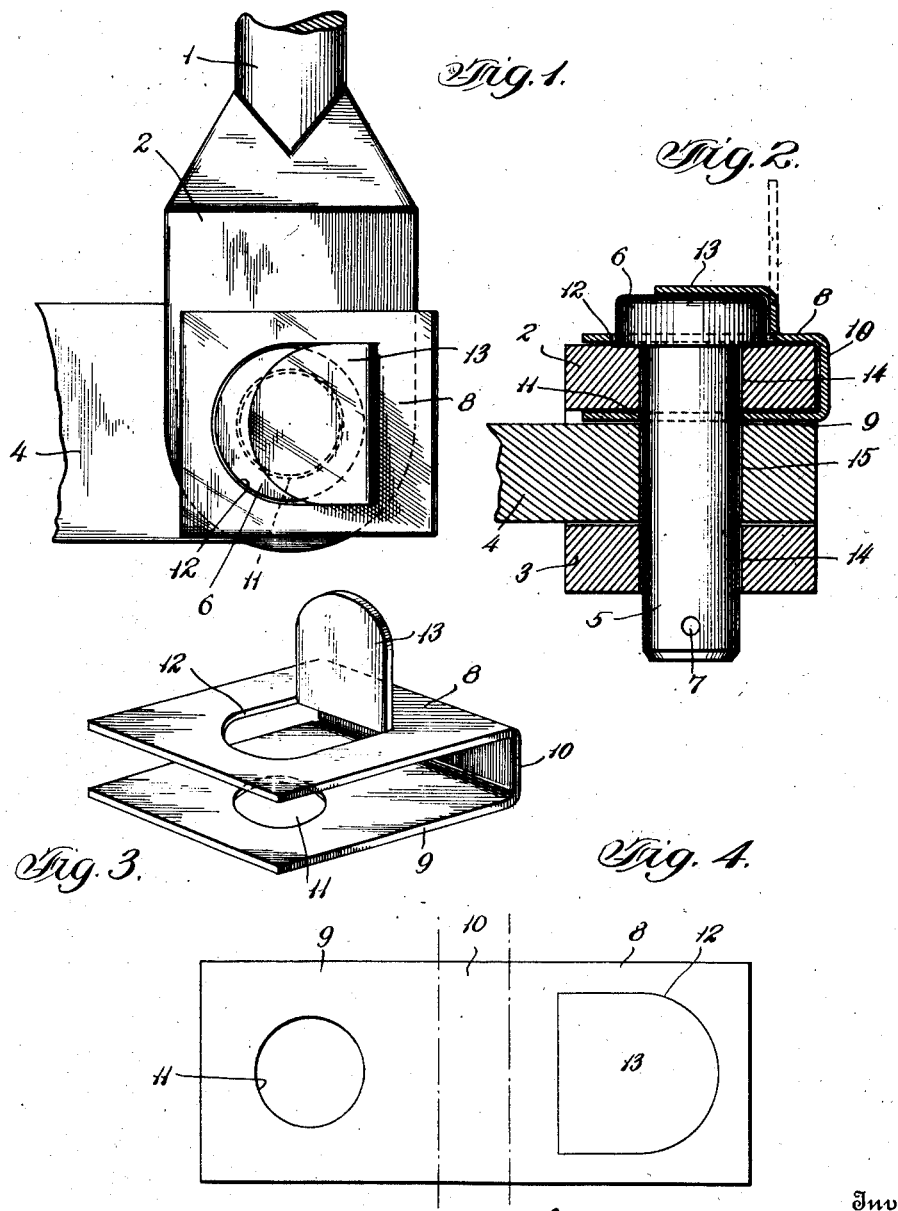

Patented Aug. 7, 1928.

1,679,420

UNITED STATES PATENT OFFICE.

VICTOR H. HARBERT, OF SPRINGFIELD, ILLINOIS, ASSIGNOR TO E. PAYSON SMITH, OF SPRINGFIELD, ILLINOIS.

SAFETY DEVICE FOR RAILROAD-CAR-BRAKE BEAMS.

Application filed March 17, 1925. Serial No. 16,199.

This invention relates to improvements in safety devices for railroad rolling stock including locomotives, generally, but more particularly for brake beams and the like.

A further object of my invention is to provide a device of this character that is simple, cheap to manufacture, but very efficient.

Car repairers and car builders at times fail to spread the cotter keys which are commonly used to lock the pins for brake levers, brake hangers, and brake fulcrums, and in other locations where pins are used. Again cotter keys frequently fail in service by breaking and either cause or permit the pins to work out whereupon the brake riggings fall to the track which is the cause of many railroad wrecks.

If the brake rigging falls the air brake mechanism is out of service rendering the brakes inoperative. In addition to the loss of braking power on the car the United States safety appliance regulations require the brake to be in good braking condition and they attach a penalty defect to cars found in this condition and the fines levied by the Commission amount during the year to a considerable sum against a railroad.

Among other advantages resulting from my invention may be mentioned the fact that where my device is used a shorter brake pin may be used than where a cotter pin is used, besides which it is not necessary to drill a cotter pin hole through the pin. Some railroads prefer to use the usual length of brake pin and also the cotter pin, but this does not prevent the use of my improved safety device.

In the drawings

Figure 1 is a top plan view of portions of a connector rod and brake hanger with my safety device applied.

Figure 2 is a sectional view of the same.

Figure 3 is a perspective view of my safety device.

Figure 4 is a top plan view of the blank from which my safety device is made.

The reference numeral 1 designates the connecting rod having the usual forked ends 2 and 3 adapted to receive between them an end of the brake beam 4 as is usual in railroad practice, the brake beam being secured between the forked ends 3 and 4 by means of the usual pin 5, said pin having a head 6 at one end, and a cotter pin hole 7 drilled through its other end.

The constructions and parts thus far referred to are old and it has been the practice to place a cotter pin in the hole 7 of the bolt and spread the ends thereof to prevent it from falling out of said hole 7 but it has been found by experience that frequently no pin is put in the hole, or if put in, it was not spread and leaving it free to drop out. Again cotter pins have broken in service. Under all these conditions the pin 5 is free to work out thereby leaving the brake beam free to drop on the tracks which is the direct cause of many wrecks and accidents. The cotter pins are small and hard to handle, especially in cold weather.

I have devised means to reduce to a minimum, if not entirely eliminate the liability of the brake pin 5 from falling out, and my invention consists of two members 8, 9, spaced substantially parallel by means of the spacing member 10 which joins them together, all of these members being integral and preferably composed of flat sheet metal. The elements 8, 9 and 10 could be termed a substantially U-shaped body and I may so refer to them in the claims for sake of brevity.

The member or arm 9 is provided with a pin opening 11 near its free end, and the member 8 is also provided with a pin opening 12 in alignment with the opening 11. The opening 12 is formed by striking up from the member 8 the guard or tongue 13, which is positioned in its upstanding position shown in the drawings. The device when offered for sale has its parts in the relative position shown in Figure 3.

When the openings 14 of the connecting rod 1 and the opening 15 of the brake beam are in alignment, the member 9 of my safety device is slipped between the brake beam and the forked end 2 of the connecting rod, with the member 8 overlying the top of the forked end 2 with the guard 13 in the dotted position shown in Figure 2. The pin 5 is then passed through the aligned openings in my safety device and the forked ends and brake beam, whereupon the guard or tongue 13 is hit with a hammer and bent over the head 6 of the pin 5 to the position shown in full lines in Figure 2 in which position it securely locks the pin 5 in operative position and positively holds it from dropping out, whereby the accidental dropping of the brake beam is eliminated.

I am aware that some changes may be made in the several parts within the scope of the appended claims and without departing from the spirit of my invention.

I claim.

1. A safety device blank of the character described comprising a flat body having an opening therethrough near one end and an opening near the other end, and a guard in one of said openings free from the walls of the opening except at one end and adapted to be bent up out of the opening.

2. A safety device of the character described, comprising a substantially U-shaped body having a port through each of the parallel members of said body in alignment with each other, and a guard at one end of the wall of one of said ports and adapted to be bent over its port to prevent the passage of a bolt or pin therethrough.

3. A safety device of the character described comprising a substantially U-shaped member having ports through the parallel members of said body, and in alignment with each other, and a guard integral with and extending from one of said parallel members and adapted to be bent above the ports to prevent passage of an element through said ports.

4. A safety device of the character described, comprising spaced members connected together at one end, each member having ports in alignment with each other, and a guard struck up from one side of the port in one of said members in proximity to the port of such member.

5. In a safety lock for a pin, a sheet metal member formed in substantially U-shape, and an integral tongue struck up from one leg of said U-shaped member and leaving an elongated slot therein to receive a pin, said tongue being adapted to be bent down over the head of said pin so as to secure the same between said leg having the slot therein and said tongue.

6. A safety lock for a pin, including a sheet metal member bent in substantially U-form, one leg of the U having an elongated slot therein and the metal within the slot struck up to form an integral tongue to be bent down over the head of a pin, the opposite leg having an aperture therein to receive the pin.

7. As an article of manufacture, a safety retainer comprising: a plate of generally U-shape, each of the arms thereof having an opening therein adjacent its free end, said plate having an integral bendable tang united with the main body of the plate at a point intermediate said openings and adjacent one of them, said tang being of such extent that a portion thereof is adapted to be bent over the end of a pin extending through said openings.

8. A safety lock for a pin, including a sheet metal member bent in substantialyl U form, said member having a slot therein extending longitudinally thereof, and the metal within said slot struck up to form a tongue integral with said member and adapted to be bent over the end of a pin, one leg of the U being adapted to engage a pin receiving element to hold said member on the latter against displacement longitudinally of the pin.

9. A safety lock for a pin, including a sheet metal member having a slot therein extending longitudinally of said member, and the metal within said slot struck up to form an integral bendable tongue to be bent longitudinally of said member over the end of a pin, said member having a part to engage with an element receiving the pin to hold said member on said element against displacement longitudinally of said pin.

In testimony whereof I affix my signature.

VICTOR H. HARBERT.